United States Patent
Green

(10) Patent No.: US 7,970,519 B2
(45) Date of Patent: Jun. 28, 2011

(54) CONTROL FOR AN EARTH MOVING SYSTEM WHILE PERFORMING TURNS

(75) Inventor: Francisco Green, Dayton, OH (US)

(73) Assignee: Caterpillar Trimble Control Technologies LLC, Dayton, OH (US)

( * ) Notice: Subject to any disclaimer, the term of this patent is extended or adjusted under 35 U.S.C. 154(b) by 1083 days.

(21) Appl. No.: 11/528,268

(22) Filed: Sep. 27, 2006

(65) Prior Publication Data

US 2008/0073089 A1 Mar. 27, 2008

(51) Int. Cl.
*G06F 19/00* (2006.01)
(52) U.S. Cl. .......................... 701/50; 701/220; 340/685
(58) Field of Classification Search .................. 701/36, 701/41, 42, 50
See application file for complete search history.

(56) References Cited

U.S. PATENT DOCUMENTS

| | | | | |
|---|---|---|---|---|
| 2,892,384 | A * | 6/1959 | Kelly | 89/41.11 |
| 3,079,080 | A * | 2/1963 | Mason | 701/124 |
| 3,699,316 | A * | 10/1972 | Lopes, Jr. | 701/220 |
| 3,974,699 | A * | 8/1976 | Morris et al. | 73/865.9 |
| 4,266,625 | A * | 5/1981 | Garner et al. | 180/6.48 |
| 4,273,196 | A * | 6/1981 | Etsusaki et al. | 172/4.5 |
| 4,288,196 | A * | 9/1981 | Sutton, II | 414/699 |
| 4,337,836 | A * | 7/1982 | Seaberg | 172/826 |
| 4,537,259 | A | 8/1985 | Funabashi et al. | |
| 4,896,268 | A * | 1/1990 | MacGugan | 701/220 |
| 5,146,417 | A * | 9/1992 | Watson | 702/85 |
| 5,174,385 | A * | 12/1992 | Shinbo et al. | 172/4.5 |
| 5,190,111 | A | 3/1993 | Young et al. | |
| 5,487,428 | A * | 1/1996 | Yamamoto et al. | 172/4.5 |
| 5,503,232 | A * | 4/1996 | Matsushita et al. | 172/2 |
| 5,551,518 | A * | 9/1996 | Stratton | 172/4.5 |
| 5,564,507 | A * | 10/1996 | Matsushita et al. | 172/3 |
| 5,572,809 | A * | 11/1996 | Steenwyk et al. | 37/348 |

(Continued)

FOREIGN PATENT DOCUMENTS

EP 0 501 616 A2 9/1992

(Continued)

OTHER PUBLICATIONS

International Search Report and Written Opinion dated Jan. 17, 2008 for International application No. PCT/US2007/075320.

(Continued)

*Primary Examiner* — Thomas G Black
*Assistant Examiner* — Sze-Hon Kong
(74) *Attorney, Agent, or Firm* — Dinsmore & Shohl LLP

(57) ABSTRACT

An earthmoving system, includes in one embodiment a laser transmitter for transmitting a reference beam of laser light, and a laser receiver mounted on a mast on the bulldozer blade. The bulldozer has a frame and a cutting blade supported by a blade support extending from said frame. The blade support includes hydraulic cylinders for raising and lowering the blade in relation to said frame, and for tilting the blade along its length. The mast extends upward from, and is movable with, the blade. An inclinometer is mounted for movement with the blade to provide an indication of the inclination of the blade. A sensor detects turning of the bulldozer. A control is responsive to the laser receiver, to the inclinometer, and to the sensor, for controlling the operation of said cylinders and adjusting the position of said blade. When rapid turning of said bulldozer is detected the control operates to reduce the errors that would otherwise result from an erroneous inclinometer output.

41 Claims, 3 Drawing Sheets

U.S. PATENT DOCUMENTS

| | | | | |
|---|---|---|---|---|
| 5,678,979 | A * | 10/1997 | Kovacs | 414/700 |
| 5,713,144 | A * | 2/1998 | Haraoka | 37/348 |
| 6,068,060 | A * | 5/2000 | Ohtomo et al. | 172/4.5 |
| 6,076,027 | A * | 6/2000 | Raad et al. | 701/38 |
| 6,112,145 | A * | 8/2000 | Zachman | 701/50 |
| 6,600,985 | B2 * | 7/2003 | Weaver et al. | 701/45 |
| 6,655,465 | B2 * | 12/2003 | Carlson et al. | 172/4.5 |
| 6,661,524 | B2 * | 12/2003 | Smith et al. | 356/614 |
| 6,823,616 | B1 * | 11/2004 | Gutter et al. | 37/461 |
| 6,860,706 | B2 * | 3/2005 | Godwin et al. | 414/723 |
| 6,965,397 | B1 * | 11/2005 | Honey et al. | 348/208.2 |
| 7,121,355 | B2 * | 10/2006 | Lumpkins et al. | 172/4.5 |
| 7,293,376 | B2 * | 11/2007 | Glover | 37/414 |
| 7,317,977 | B2 * | 1/2008 | Matrosov | 701/50 |
| 7,584,806 | B2 * | 9/2009 | Weirich et al. | 172/831 |
| 7,588,088 | B2 * | 9/2009 | Zachman | 172/4.5 |
| 7,640,683 | B2 * | 1/2010 | McCain | 37/348 |
| 7,844,415 | B1 * | 11/2010 | Bryant et al. | 702/151 |
| 2002/0128795 | A1 * | 9/2002 | Schiffmann | 702/151 |
| 2004/0122580 | A1 * | 6/2004 | Sorrells | 701/80 |
| 2006/0155447 | A1 * | 7/2006 | Uken et al. | 701/50 |
| 2008/0229885 | A1 * | 9/2008 | Mah et al. | 81/32 |
| 2008/0243344 | A1 * | 10/2008 | Casey et al. | 701/50 |
| 2008/0269963 | A1 * | 10/2008 | Vos et al. | 701/4 |

FOREIGN PATENT DOCUMENTS

EP          1 630 636 A2      3/2006

OTHER PUBLICATIONS

Chinese Office Action, dated Jan. 12, 2011, Chinese Application No. 200780036158.2, Caterpillar Trimble Control Technologies LLC.

* cited by examiner

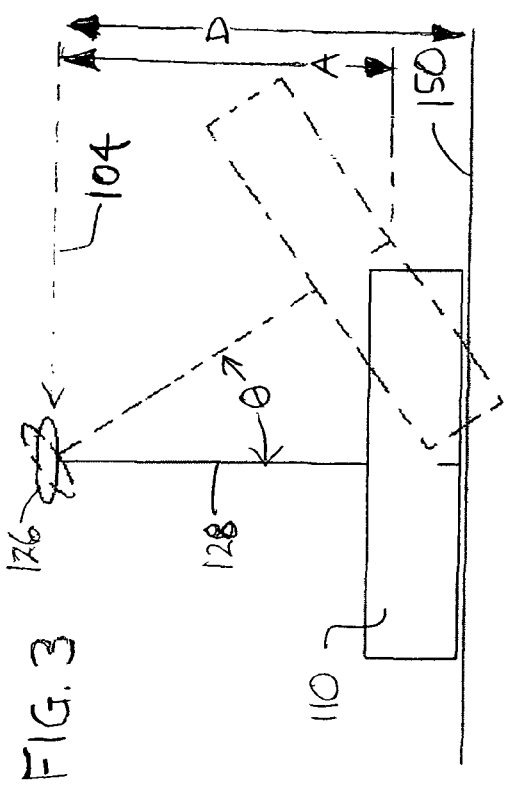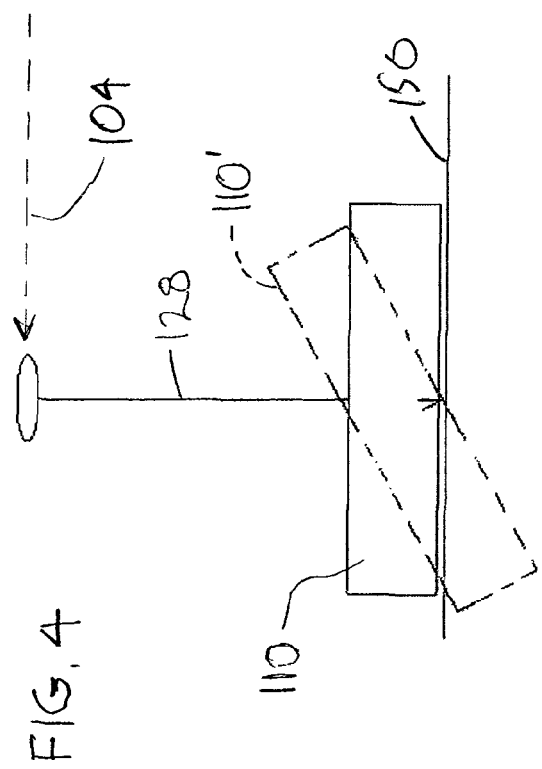

CONTROL FOR AN EARTH MOVING SYSTEM WHILE PERFORMING TURNS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

Various control arrangements have been developed to control earthmoving devices, such as bulldozers, so that a tract of land can be graded to a desired level or contour. A number of systems have been developed in which the position of the earthmoving apparatus is determined with a laser, GPS or optically referenced positioning system. In such systems, a tract of land is surveyed and a site plan is designed with the desired finish contour. From the tract survey and the site plan, a cut-fill map is produced showing amounts of cut or fill needed in specific areas of the tract of land to produce the desired finish contour. The information is then stored in the computer control system on the earthmoving apparatus.

In one type of control system for earthmoving apparatus, a position reference receiver, such as a laser receiver, is mounted on a mast that extends upward from the cutting blade. The laser receiver intercepts a reference beam of laser light that is projected from a transmitter and that rotates in a plane above the tract of land. The beam provides vertical reference position information to the machine control system. The x and y position information may be determined by other reference beams, by a GPS system, or by other navigation techniques. The vertical intercept point of the laser beam on the laser receiver, which is indicative of elevation of the cutting blade, is provided to the computer control system. The control system has stored the length of the mast on which the receiver is mounted. In an automatic mode, the control system calculates the elevation error of the grading implement based on the cut-fill map and the detected planar position of the apparatus. In another type of control system for earthmoving apparatus, a GPS receiver antenna is carried on a mast which extends upward from the cutting blade. In this type of system, the GPS receiver determines the vertical position information for the machine control system, as well as the x and y position information.

An inclinometer is mounted on the cutting blade to provide an indication of the inclination of the blade along its length. Since the mast extends upward from the blade, the inclinometer also provides an indication of the tilt of the mast away from true vertical. It will be appreciated that the measured distance from the laser beam to the cutting edge of the blade or from the GPS antenna to the cutting edged of the blade can be multiplied by the cosine of this tilt angle to compensate for the tilted mast and to provide an indication of the actual vertical displacement between the laser beam or the GPS antenna and the cutting edge of the blade. The inclinometer may also be used, either alone or in combination with a laser-based system, a GPS-based system, or a system that has both laser and GPS measurement devices, to control the inclination of the blade or to monitor the inclination of the blade.

Inclinometers of this type are gravity based and, although typically damped to reduce noise from high frequency vibration, are subject to error due to acceleration experience during operation of the machine. More specifically, when a machine such as a bulldozer makes a turn as it is moving at a relatively rapid speed, the inclinometer will provide an erroneous output, indicating that the blade is inclined at an angle that differs significantly from the actual orientation of the blade. This erroneous output will have a deleterious effect upon the operation of the machine. If the machine is the type in which a height sensor is carried on a mast attached to the blade, the system will compute an erroneous blade height. This will be displayed, and, if the system is operating in an automatic mode, may cause the blade to be lowered erroneously. If the inclinometer output is being used to display or control blade inclination, an error in the display or the control as to blade orientation will also occur.

It is seen that there is a need, therefore, for an earthmoving system and method having a bulldozer or other earthmoving machine and including a control in which compensation is made for inaccuracies in the cutting blade position or orientation that would otherwise result from rapidly turning the bulldozer.

SUMMARY OF THE INVENTION

These needs are met by an earthmoving method and system according to the present invention, which includes a laser transmitter for transmitting a reference beam of laser light, and a bulldozer, having a frame and a cutting blade supported by a blade support extending from the frame. The blade support includes hydraulic cylinders for raising and lowering the blade in relation to the frame. A laser receiver is mounted on a mast extending upward from, and movable with, the cutting blade. The laser receiver senses the reference beam of laser light. An inclinometer is mounted for movement with the cutting blade to provide an indication of the inclination of the blade. A sensor detects turning of the bulldozer. A control is responsive to the laser receiver, to the inclinometer, and to the sensor, for controlling the operation of the cylinders and adjusting the position of the blade. The control keeps the blade at an unchanged level when rapid turning of the bulldozer is detected. As a consequence, undesired vertical movement of the blade that might otherwise result from an erroneous inclinometer reading is reduced.

The laser transmitter may comprise a transmitter that provides a rotating beam of laser light. The control then determines the position of the cutting blade each time the receiver is illuminated by the rotating beam. The sensor may comprise a sensor connected to the steering system of the bulldozer to detect turning. The sensor may comprise a circuit for detecting a rapid change in the output of the inclinometer. The sensor may comprise a circuit for detecting a rapid change in the output of the inclinometer without an operation of the hydraulic cylinders that would account for such a change. The control may keep the blade at an unchanged level for a preset period of time after turning of the bulldozer is discontinued, whereby erroneous vertical movement of the blade is reduced.

The method of controlling the position of the cutting blade of a bulldozer may comprise the steps of periodically determining the location of the cutting blade by sensing the relative position of a reference beam of laser light using a laser receiver mounted on a mast extending upward from the cutting blade, and sensing the inclination of the cutting blade with an inclinometer mounted on the blade. Turning of the bulldozer is then sensed. The operation of the hydraulic cylinders controlling the position of the blade is controlled so that the vertical position of the cutting blade is not changed during the turning of the bulldozer.

The sensor may be connected to the steering system of the bulldozer. The sensor may detect a rapid change in the output of the inclinometer, and especially a rapid change in the output of the inclinometer without an operation of the hydraulic cylinders that would account for such a change. The control may maintain the blade at an unchanged level for a preset period of time after turning the bulldozer is discontinued. By this arrangement, erroneous vertical movement of the blade may be reduced.

It is an object of the present invention to provide an earthmoving system and a method of operating such a system in which the height of the cutting blade is maintained constant during rapid turns. Other objects and advantages of the invention will be apparent from the following description, the accompanying drawings, and the appended claims.

BRIEF DESCRIPTION OF THE DRAWINGS

FIGS. 3-4 are simplified diagrammatic representations of a cutting blade, laser receiver, and the mast that extends upward from the blade and upon which the laser receiver is mounted.

DETAILED DESCRIPTION OF THE INVENTION

Figure 1:
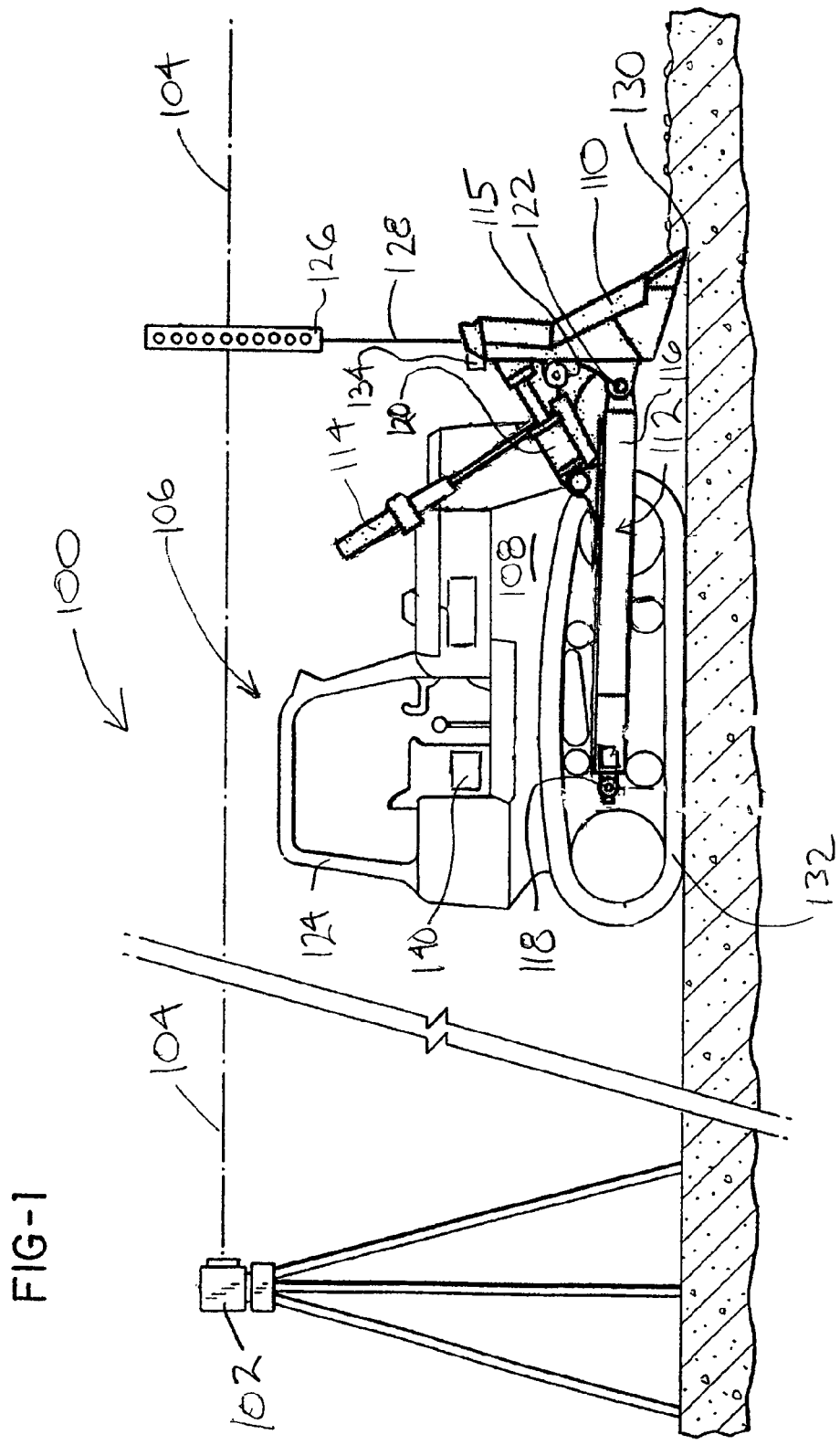
FIG. 1 is a side elevation view of an earthmoving system in accordance with the present invention.

Reference is now made to FIG. 1, which illustrates an earthmoving system 100, constructed according to the present invention. The system 100 includes a laser transmitter 102 for transmitting a reference beam of laser light 104. The beam of laser light is rotated about a vertical axis to define a horizontal reference plane. As is known, the reference plane may be tilted at a precisely controlled angle to the horizontal if a grade is to be defined by the plane of light.

The system 100 further includes a bulldozer 106, having a frame 108 and a cutting blade 110. The cutting blade 110 is supported by a blade support 112 that extends from the frame 108. The blade support 112 includes a pair of hydraulic cylinders 114, only one of which is shown in FIG. 1, for raising and lowering the blade 110 in relation to the frame. A pair of arms 116, one of which is shown in FIG. 1, are attached to opposite ends of blade support 112 and pivotally attached to the frame 108 at 118. Cylinders 114 can be extended or retracted to lower or to raise blade 110 as arms 112 pivot about 118. Cylinders 120 extend between the top of blade 110 and arms 116 and may be used to pivot the blade about pivot connection 122. A hydraulic cylinder 115 extends across the back of the blade support and is appropriately connected to cause the blade 110 to be tilted in either direction along its length as the cylinder 115 is extended or retracted. Bulldozer 106 has a cab 124 from which an operator can select an automatic mode of operation, or a manual mode of operation in which the operator manually actuates various controls to control the operation of the bulldozer.

The earthmoving system 100 further includes a laser receiver 126 mounted on the bulldozer 106 for sensing the rotating laser light reference beam 104. The receiver 126 is shown mounted on a mast 128, which extends upward from the blade 110. The receiver 126 detects the height of the beam 104, making it possible to determine the vertical height of the cutting edge 130 of cutting blade 110. The transmitter 102 typically projects a beam of laser light that is rotated in a reference plane at frequency of perhaps 600 rpm. The system 100 further includes an inclinometer 134 mounted for movement with said cutting blade 110 to provide an indication of the inclination of the blade 110 along the length of the blade. Such an inclinometer is typically a gravity-based device which, although damped, may nevertheless provide to erroneous outputs when it is subjected to transient non-vertical acceleration. A control 140, typically located in cab 124, is responsive to the laser receiver 126, and the inclinometer 134, for controlling the height of the cutting blade 110 when the system is in the automatic mode and for providing a display of the height of the cutting blade to the operator in the cab 124 when the system is in the manual mode.

A control Reference is made to FIG. 3 which illustrates the manner in which one type of error can occur. In the diagram of FIG. 3, the blade 110, the mast 128 and the laser receiver 126 are shown in solid lines as the bulldozer moves over the surface 150 of the worksite at the desired height, as determined from the receipt of the reference laser beam 104 which is detected a distance D above the surface 150. A difficulty develops when the inclinometer 134 is subjected to lateral acceleration, as for example when the bulldozer executes a turn. Assuming that just prior to entering the turn, the blade 110 was at the desired vertical height, a height that was to be maintained during the turn, this lateral acceleration may cause the inclinometer to provide an output indicating that the inclinometer is tipped by an angle $\Theta$, for example, when in fact the inclinometer may not be inclined at all. As a consequence, the control 140, which routinely compensates for tipping of the blade 110 and mast 128 during the operation of the bulldozer, may erroneously compute the distance from the beam 104 to the cutting edge of the blade 110 to be equal to $A = D \cos \Theta$, rather than the actual distance D. Because the control 140 has computed the blade to be at a level that is above the desired blade position (in this example a distance D below the laser beam), the automatic control system will cause the cylinders 114 to extend, lowering the blade. It will be appreciated that the result is that the blade will drop too low, causing the worksite surface to be gouged, and requiring that the operator either quickly override the automatic control manually or that the operator make additional passes over the gouged area. It will be appreciated that the same error will occur in systems of the type that use a GPS antenna on the mast, rather than a laser receiver, to determine blade height. Additionally, in those systems in which the output of the inclinometer is used to provide an indication of the slope of the blade or to control the slope of the blade automatically, it is apparent that the acceleration to which the inclinometer is subjected during a turn will cause errors in the display of the blade orientation or in the display and control of the blade orientation.

The present invention addresses these errors. In a one embodiment, a sensor arrangement is provided to sense when the bulldozer 106 is turning. The control system then keeps the blade 110 at an unchanged level as long as turning of said bulldozer is detected. The assumption here is that the blade is at the desired height at the time that turning the bulldozer is first sensed. Vertical movement of the blade is then discontinued for the duration of the turn. As an alternative, vertical movement of the blade may be blocked for a predetermined period of time. This approach may typically result in the blade 110 moving from the position shown in solid lines in FIG. 4 to the position shown in dashed lines, labeled 110'. While the system will not attempt to raise the blade, it may cause the blade to tilt somewhat, since it will be controlling the inclination of the blade using an erroneous tilt angle from the inclinometer 134. This problem may be addressed, however, by having the control 140 also block any change in the inclination of the blade by the cylinder 115 during the same time that the height of the blade 110 is held unchanged as bulldozer turning is detected.

In another embodiment, during the turning of the bulldozer, changes in tilting of the blade 110 by the cylinder 115 may be blocked, but the vertical height of the blade may continue to be controlled. In this version, the erroneous signal from the inclinometer is not used in the computation of the height A according to the equation A=D cos Θ. Rather, the inclination angle Θ of the blade 110 and the mast 128 that is measured just prior to the initiation of the turn is used throughout the turn in computing the height A for display or for control purposes. The assumption, of course, is that this angle is not changing significantly. In another embodiment, rather than blocking change in the vertical height of the blade or the inclination of the blade by preventing the extension or retraction of cylinders 114 and 115 during turning, the output of the inclinometer may be heavily damped, but only during the time that the turning of the bulldozer takes place. In yet another alternative, the output of the inclinometer may be heavily damped when turning is initially detected and for a predetermined period of time thereafter.

Figure 2:
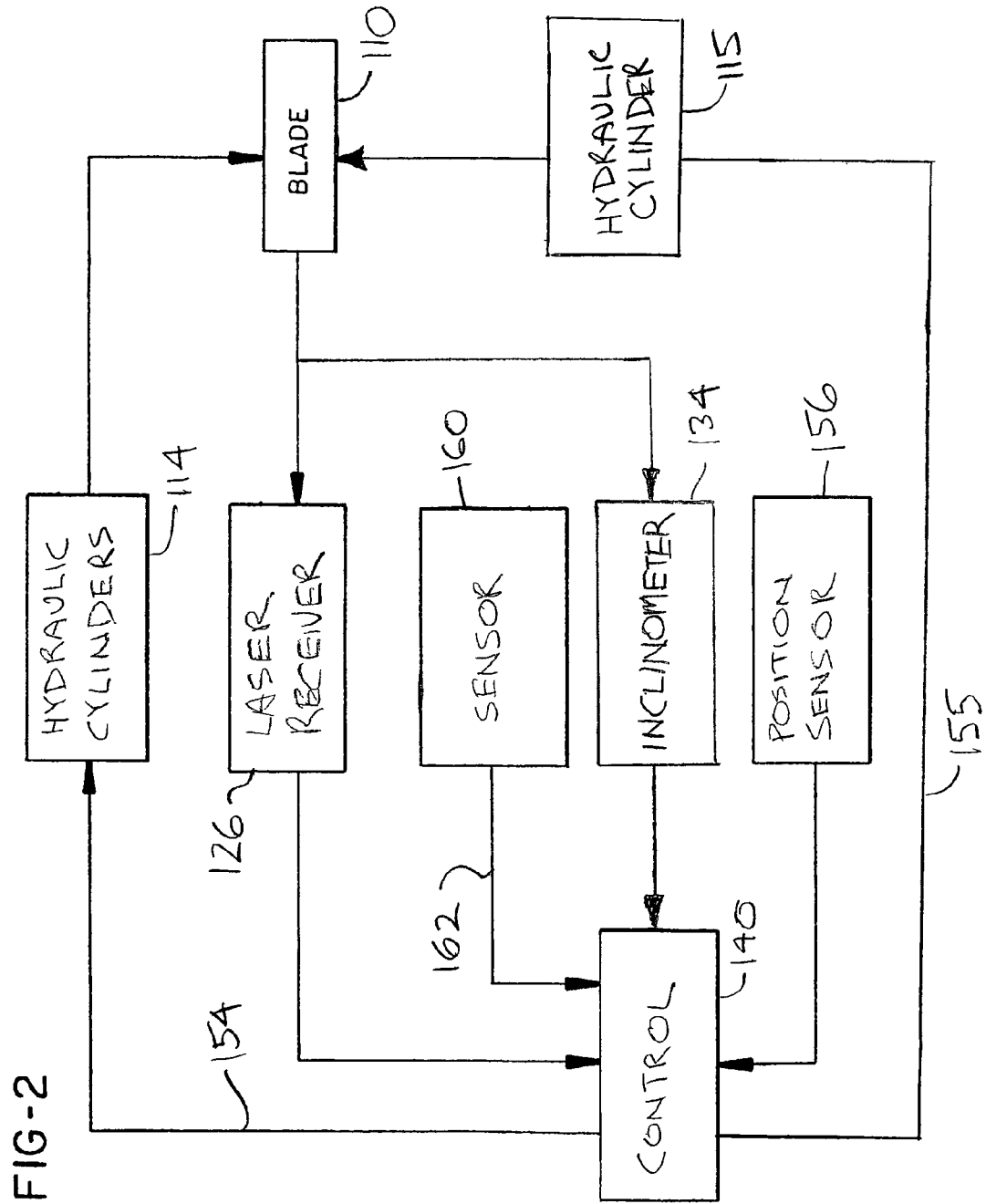
FIG. 2 is a block diagram of the control used in the earthmoving system of FIG. 1, in accordance with the present invention.

The control system of the present invention is illustrated schematically in FIG. 2. The hydraulic cylinders 114 are extended or retracted in response to signals on line 154 to electrically actuated hydraulic valves. The blade 110 is raised or lowered by the cylinders 114, also raising and lowering laser receiver 126 which senses the beam 104. The hydraulic cylinder 115 is extended or retracted in response to signals on line 155 to an electrically actuated hydraulic valve. The blade 110 is titled in either direction along its length by the extension or retraction of cylinder 115, also tilting inclinometer 134 which senses the orientation of the blade 110. Inclinometer 134 provides an output to control 140. The position sensor 156 may be a GPS or other system which determines the X and Y coordinates of the bulldozer at the worksite. From this information the control determines the desired height of the graded ground. The control 140 also determines the actual height of the cutting edge of the blade 110 from the laser receiver output and the inclinometer output. This may be displayed to the operator in the bulldozer cab 124. The difference between the actual height and the desired height may also be used to drive the blade upward or downward when the system is in the automatic mode.

Sensor 160 detects turning of said bulldozer 106 and provides a signal on line 162 to control 140. The sensor 160 may be any of a number of alternative constructions including a sensor which is connected to the steering system of the bulldozer and directly determines when the steering mechanism is turned. The system may also include a circuit that detects when the treads of the bulldozer are moving in opposite directions, as when the bulldozer is rotating in place. Alternatively, the sensor may comprise a circuit for detecting a rapid change in the output of said inclinometer. In another version the sensor may detect a rapid change in the output of the inclinometer during a period of time when there is no actuation of hydraulic cylinder 115 that would account for such a change. Such a circuit may, for example, be a high pass filter or a derivative circuit that provides the time derivative of the inclinometer output. If desired, the control may keep the blade at an unchanged level and orientation for a preset period of time after turning of the bulldozer is discontinued. By this arrangement, erroneous vertical movement of the blade may be reduced.

Although the earthmoving apparatus 100 is illustrated as a including bulldozer 106, any earthmoving machine using a blade or other grading implement to cut and fill soil can advantageously employ the present invention, as will be readily apparent to those skilled in the art. For example, a motorgrader, a front end loader, skid steer, or a power shovel may utilize a control according to the present invention, although such a control may be of lesser importance, depending upon the speed at which the machine moves and the resulting error that can occur due to acceleration forces applied to an inclinometer during turning.

It should be appreciated that although the present invention has been illustrated in a system in which a laser receiver is carried on the blade mounted mast for determining the height of the cutting edge of the blade, with the error in cutting edge height being compensated based on inclination of the blade and with the desired inclination of the blade being monitored and corrected, both in display mode and in the automatic control mode, the present invention also contemplates making correction in those instances in which the measured inclination of the blade is used to correct a GPS based system or a laser based system with the inclination of the blade not being controlled.

Having thus described the earthmoving apparatus and method of the present invention in detail and by reference to preferred embodiments thereof, it will be apparent that modifications and variations are possible without departing from the scope of the invention defined in the appended claims.

What is claimed is:

1. An earthmoving system, comprising:
   a laser transmitter for transmitting a reference beam of laser light,
   a bulldozer, having a frame and a cutting blade supported by a blade support extending from said frame, said blade support including hydraulic cylinders for raising and lowering said blade in relation to said frame,
   a laser receiver mounted on a mast extending upward from, and movable with, said cutting blade, said laser receiver sensing said reference beam of laser light,
   an inclinometer mounted for movement with said cutting blade to provide an indication of the inclination of said blade,
   a sensor for detecting turning of said bulldozer, and
   a control, responsive to said laser receiver, to said inclinometer, and to said sensor, for controlling the operation of said cylinders and adjusting the position of said blade, said control keeping said blade at an unchanged level when rapid turning of said bulldozer is detected regardless of the output from the inclinometer, whereby erroneous vertical movement of the blade is reduced.

2. The earthmoving system of claim 1, in which said laser transmitter comprises a transmitter that provides a rotating beam of laser light, and in which said control determines the position of said cutting blade each time said receiver is illuminated by said rotating beam.

3. The earthmoving system of claim 1, in which said sensor comprises a sensor connected to the steering system of said bulldozer to detect turning.

4. The earthmoving system of claim 1, in which said sensor comprises a circuit for detecting a rapid change in the output of said inclinometer without an operation of the hydraulic cylinders that would account for such a change.

5. The earthmoving system of claim 1, in which said sensor comprises a circuit for detecting a rapid change in the output of said inclinometer.

6. The earthmoving system of claim 1, in which said control keeps said blade at an unchanged level for a preset period of time after turning of said bulldozer is discontinued, whereby erroneous vertical movement of the blade is reduced.

7. An earthmoving system, comprising:
an earthmoving machine, having a cutting blade supported by a blade support, said blade support including hydraulic cylinders for raising and lowering said blade,
a laser receiver mounted on a mast extending upward from, and movable with, said cutting blade, said laser receiver sensing a reference beam of laser light,
an inclinometer mounted for movement with said cutting blade to provide an indication of the inclination of said blade,
a sensor for detecting turning of said machine, and
a control, responsive to said laser receiver, to said inclinometer, and to said sensor, for controlling the operation of said cylinders and adjusting the position of said blade, said control keeping said blade at an unchanged level when rapid turning of said machine is detected regardless of the output from the inclinometer, whereby erroneous vertical movement of the blade is reduced.

8. The earthmoving system of claim 7, in which said sensor comprises a sensor connected to the steering system of said earthmoving machine to detect turning.

9. The earthmoving system of claim 7, in which said sensor comprises a circuit for detecting a rapid change in the output of said inclinometer without an operation of the hydraulic cylinders that would account for such a change.

10. The earthmoving system of claim 7, in which said sensor comprises a circuit for detecting a rapid change in the output of said inclinometer.

11. The earthmoving system of claim 7, in which said control keeps said blade at an unchanged level for a preset period of time after turning of said earthmoving machine is discontinued, whereby erroneous vertical movement of the blade is reduced.

12. A method of controlling the position of the cutting blade of a bulldozer, said bulldozer having a frame and said cutting blade, said cutting blade supported by a blade support extending from said frame, said blade support including hydraulic cylinders for raising and lowering said blade in relation to said frame, comprising the steps of:
periodically determining the location of the cutting blade by sensing the relative position of a reference beam of laser light using a laser receiver mounted on a mast extending upward from said cutting blade,
sensing the inclination of the cutting blade with an inclinometer mounted on said blade,
sensing turning of said bulldozer, and
controlling the operation of said cylinders and thereby the position of said cutting blade such that the vertical position of the cutting blade is not changed for a period of time during turning of the bulldozer, regardless of the output from the inclinometer.

13. The method of controlling the position of the cutting blade of a bulldozer according to claim 12, in which the sensor is connected to the steering system of said bulldozer to detect turning.

14. The method of controlling the position of the cutting blade of a bulldozer according to claim 12, in which the sensor includes a circuit for detecting a rapid change in the output of the inclinometer without an operation of the hydraulic cylinders that would account for such a change.

15. The method of controlling the position of the cutting blade of a bulldozer according to claim 12, in which said sensor detects a rapid change in the output of said inclinometer.

16. The method of controlling the position of the cutting blade of a bulldozer according to claim 12, in which said control maintains said blade at an unchanged level for a preset period of time after turning said bulldozer is discontinued, whereby erroneous vertical movement of the blade is reduced.

17. An earthmoving system, comprising:
a bulldozer, having a frame and a cutting blade supported by a blade support extending from said frame, said blade support including hydraulic cylinders for raising and lowering said blade in relation to said frame,
a reference position system for determining the position of the bulldozer,
an inclinometer mounted for movement with said cutting blade to provide an indication of the inclination of said blade,
a sensor for detecting turning of said bulldozer, and
a control, responsive to said inclinometer and to said sensor, for controlling the operation of said cylinders and adjusting the position of said blade, said control keeping said blade at an unchanged level when rapid turning of said bulldozer is detected, regardless of the output from the inclinometer, whereby erroneous vertical movement of the blade is reduced.

18. The earthmoving system of claim 17, in which said sensor comprises a sensor connected to the steering system of said bulldozer to detect turning.

19. The earthmoving system of claim 17, in which said sensor comprises a circuit for detecting a rapid change in the output of said inclinometer without an operation of the hydraulic cylinders that would account for such a change.

20. The earthmoving system of claim 17, in which said sensor comprises a circuit for detecting a rapid change in the output of said inclinometer.

21. The earthmoving system of claim 17, in which said control keeps said blade at an unchanged level for a preset period of time after turning of said bulldozer is discontinued, whereby erroneous vertical movement of the blade is reduced.

22. A method of controlling the position of the cutting blade of a bulldozer, supported by a blade support including hydraulic cylinders for raising and lowering said blade, said bulldozer further including an inclinometer providing an indication of the inclination of the blade, comprising the steps of:
operating said cylinders to controlling the height and inclination of the cutting blade in response to outputs from said inclinometer,
sensing turning of said bulldozer, and
maintaining the position of the cylinders and maintaining the height of the blade at its then current height when turning of the bulldozer is sensed, regardless of the output from the inclinometer, for a period sufficient to avoid undesired fluctuation in the height of the cutting blade.

23. An earthmoving system, comprising:
a bulldozer, having a frame and a cutting blade supported by a blade support extending from said frame, said blade support including hydraulic cylinders for raising and lowering said blade in relation to said frame, and changing the inclination of said blade along its length,
a position sensor mounted on a mast extending upward from, and movable with, said cutting blade, said position sensor sensing its vertical position,
an inclinometer mounted for movement with said cutting blade to provide an indication of the inclination of said blade,
a turning sensor for detecting turning of said bulldozer, and
a control, responsive to said position sensor, to said inclinometer, and to said turning sensor, for controlling the operation of said cylinders and adjusting the position and inclination of said blade, and for preventing operation of said cylinders when rapid turning of said bulldozer is detected, said control maintaining the height of the blade at its then current height when turning of the bulldozer is sensed, regardless of the output from the inclinometer, whereby erroneous vertical movement and erroneous tilting of the blade are reduced.

24. The earthmoving system of claim 23, further comprising a laser transmitter for transmitting a reference beam of laser light, and in which said position sensor comprises a laser receiver sensing said reference beam of laser light.

25. The earthmoving system of claim 23, in which said position sensor comprises a GPS receiver having a GPS antenna mounted on said mast.

26. An earthmoving system, comprising:
a bulldozer, having a frame and a cutting blade supported by a blade support extending from said frame, said blade support including hydraulic cylinders for raising and lowering said blade in relation to said frame, and changing the inclination of said blade along its length,
a position sensor mounted on a mast extending upward from, and movable with, said cutting blade, said position sensor sensing its vertical position,
an inclinometer mounted for movement with said cutting blade to provide an indication of the inclination of said blade,
a turning sensor for detecting turning of said bulldozer, and
a control, responsive to said position sensor, to said inclinometer, and to said turning sensor, for controlling the operation of said cylinders and adjusting the position and inclination of said blade, said control maintaining the height of the blade at its then current height when turning of the bulldozer is sensed, regardless of the output from the inclinometer, for a period sufficient to avoid undesired fluctuation in the height of the cutting blade such that errors that might otherwise be produced by erroneous output from said inclinometer during turning of said bulldozer are prevented.

27. The earthmoving system of claim 26, in which said turning sensor for detecting turning of said bulldozer comprises a sensor monitoring movement of the steering mechanism of said bulldozer.

28. The earthmoving system of claim 26, in which said turning sensor for detecting turning of said bulldozer comprises an inertia guidance system.

29. The earthmoving system of claim 26, in which said turning sensor for detecting turning of said bulldozer comprises a circuit which monitors the output of said inclinometer and interprets a rapid change of such output as caused by turning.

30. The earthmoving system of claim 26, in which said control keeps said inclination of said blade at an unchanged level when rapid turning of said bulldozer is detected, and permits the height of said blade to be controlled in dependence upon the output of said position sensor during turning and upon the output of said inclinometer immediately prior to turning.

31. An earthmoving system, comprising:
a bulldozer, having a frame and a cutting blade supported by a blade support extending from said frame, said blade support including a hydraulic cylinder for changing the inclination of said blade along its length,
an inclinometer mounted for movement with said cutting blade to provide an indication of the inclination of said blade,
a sensor for detecting turning of said bulldozer, and
a control, responsive to said inclinometer, for controlling the operation of said cylinder and adjusting the inclination of said blade, said control maintaining the height of the blade at its then current height when turning of the bulldozer is sensed, regardless of the output from the inclinometer, for a period sufficient to avoid undesired fluctuation in the height of the cutting blade, whereby erroneous vertical movement and erroneous tilting of the blade are reduced.

32. A method of controlling the position of the cutting blade of a bulldozer, said bulldozer having a frame and said cutting blade, said cutting blade supported by a blade support extending from said frame, said blade support including hydraulic cylinders for raising and lowering said blade in relation to said frame, and for tilting said blade, comprising the steps of:
periodically determining the location of a sensor mounted on a mast extending upward from said cutting blade,
sensing the inclination of the cutting blade and the mast with an inclinometer mounted on said blade,
sensing turning of said bulldozer, and
controlling the operation of said cylinders and thereby the position of said cutting blade during turning of the bulldozer by maintaining the height of the blade at its then current height when turning of the bulldozer is sensed, regardless of the output from the inclinometer, such that the height of the blade is not affected by an erroneous output from said inclinometer.

33. The method of controlling the position of the cutting blade of a bulldozer according to claim 32, in which the height of said blade is sensed with a laser receiver mounted on said mast.

34. The method of controlling the position of the cutting blade of a bulldozer according to claim 32, in which the height of said blade is sensed with a GPS receiver having an antenna mounted on said mast.

35. The method of controlling the position of the cutting blade of a bulldozer according to claim 32, in which turning of said bulldozer is sensed by monitoring the steering of said bulldozer.

36. The method of controlling the position of the cutting blade of a bulldozer according to claim 32, in which turning of said bulldozer is sensed by use of an inertial sensor.

37. The method of controlling the position of the cutting blade of a bulldozer according to claim 32, in which turning of said bulldozer is sensed by a rapid change in the output of said inclinometer.

38. The method of controlling the position of the cutting blade of a bulldozer according to claim 32, in which the step of controlling the operation of said cylinders and thereby the position of said cutting blade during turning of the bulldozer such that the height of the blade is not affected by an erroneous output from said inclinometer includes the step of keeping said blade at an unchanged level for a preset period of time after turning of said bulldozer is discontinued, whereby erroneous vertical movement of the blade is reduced.

39. The method of controlling the position of the cutting blade of a bulldozer according to claim 32, in which the step of controlling the operation of said cylinders and thereby the position of said cutting blade during turning of the bulldozer such that the height of the blade is not affected by an erroneous output from said inclinometer includes the step of maintaining the height of the blade at its then current height when turning of the bulldozer is sensed, regardless of the output from the inclinometer, for a period sufficient to avoid undesired fluctuation in the height of the cutting blade.

40. The method of controlling the position of the cutting blade of a bulldozer according to claim 32, in which the step of controlling the operation of said cylinders and thereby the position of said cutting blade during turning of the bulldozer such that the height of the blade is not affected by an erroneous output from said inclinometer includes the step of using the output of the inclinometer which was sensed prior to the initiation of turning in determining the height of the blade during turning.

41. The method of controlling the position of the cutting blade of a bulldozer according to claim 32, in which the inclination of the blade is not changed during the turning of the bulldozer.

* * * * *